United States Patent [19]
Cornelius et al.

[11] Patent Number: 6,048,490
[45] Date of Patent: Apr. 11, 2000

[54] METHOD OF PRODUCING CORDIERITE BODIES UTILIZING SUBSTANTIALLY REDUCED FIRING TIMES

[75] Inventors: Edward E. Cornelius, Painted Post; Gregory A. Merkel, Big Flats, both of N.Y.

[73] Assignee: Corning Incorporated, Corning, N.Y.

[21] Appl. No.: 09/114,830

[22] Filed: Jul. 14, 1998

Related U.S. Application Data

[60] Provisional application No. 60/053,938, Jul. 28, 1997.

[51] Int. Cl.$^7$ .................................................. C04B 33/32
[52] U.S. Cl. ........................... 264/631; 264/638; 264/660
[58] Field of Search .................................... 264/631, 630, 264/638, 660

[56] References Cited

U.S. PATENT DOCUMENTS

| | | |
|---|---|---|
| 3,885,977 | 5/1975 | Lachman et al. . |
| 3,979,216 | 9/1976 | Fritsch, Jr. et al. . |
| 4,001,028 | 1/1977 | Frost et al. . |
| 4,280,845 | 7/1981 | Matsuhisa et al. . |
| 4,772,580 | 9/1988 | Hamanaka et al. . |
| 4,869,944 | 9/1989 | Harada et al. . |
| 4,877,670 | 10/1989 | Hamanaka et al. . |
| 4,927,577 | 5/1990 | Ohtaka et al. . |
| 5,046,946 | 9/1991 | Yasuda et al. . |
| 5,258,150 | 11/1993 | Merkel et al. . |
| 5,262,102 | 11/1993 | Wada . |
| 5,332,703 | 7/1994 | Hickman et al. . |
| 5,409,870 | 4/1995 | Locker et al. . |

FOREIGN PATENT DOCUMENTS

| | | |
|---|---|---|
| 0 227 482 | 7/1987 | European Pat. Off. . |
| 0 506 301 | 9/1992 | European Pat. Off. . |
| 0 514 205 | 11/1992 | European Pat. Off. . |
| 5085813 | 4/1993 | Japan . |

*Primary Examiner*—Christopher A. Fiorilla
*Attorney, Agent, or Firm*—L. Rita Herzfeld

[57] ABSTRACT

A cordierite body is produced by providing cordierite-forming raw materials as talc, calcined talc, MgO-forming component, magnesium aluminate spinel, $SiO_2$-forming component, $Al_2O_3$-forming component, kaolin, calcined kaolin, and/or mullite, such that the quantity R is less than about 10.156. R is 0.140 (wt. % mullite powder)

+0.433 (wt. % $SiO_2$ powder)

+0.0781 (wt. % alpha $Al_2O_3$ powder)(mean particle size of alpha $Al_2O_3$ powder)

+0.0872 (wt. % $Al(OH)_3$ powder)(mean particle size of $Al(OH)_3$ powder)

+0.00334 (wt. % $SiO_2$ powder)(wt. % spinel powder)

+2.330 $\log_{10}$ (1+(wt. % MgO-forming component)(wt. % calcined kaolin))

−0.244 (wt. % MgO-forming component)

−0.167 (wt. % dispersible high surface area $Al_2O_3$-forming component)

+1.1305 (heating time at maximum temperature)$^{-1}$.

The raw materials are intimately blended with effective amount of vehicle and forming aids to impart plastic formability and green strength to the raw materials and form a plastic mixture. A green body is formed which is dried and heated from room temperature up to a maximum temperature of about 1360° C. to 1435° C. at an average heating rate of at least about 315° C. per hour and held at maximum temperature for about 0.05 to 4.4 hours. The total heating time from room temperature to the end of the hold at the maximum temperature is less than about 4.5 hours. The resulting body is predominately cordierite, having a mean coefficient of thermal expansion from about 25° C. to 800° C. of less than about $15 \times 10^{-7}$°C.$^{-1}$ in at least one direction. In another embodiment, the raw materials are talc, an alumina-forming source, and silica, wherein the mean particle diameter of the talc is less than about 4 micrometers, and that of the alumina—forming source is less than about 2 micrometers.

11 Claims, No Drawings

METHOD OF PRODUCING CORDIERITE BODIES UTILIZING SUBSTANTIALLY REDUCED FIRING TIMES

This application claims the benefit of U.S. Provisional application Ser. No. 60/053,938, filed Jul. 28, 1997, entitled METHOD OF PRODUCING CORDIERITE BODIES UTILIZING SUBSTANTIALLY REDUCED FIRING TIMES, by Edward E. Cornelius and Gregory A. Merkel.

This invention relates to a method of producing cordierite bodies that involves substantially reducing the firing time required to produce a low expansion body. More particularly, the body is formed by extrusion. Still more particularly, the body has a honeycomb structure.

BACKGROUND OF THE INVENTION

Cordierite bodies having honeycomb structures are especially suited for but not limited to use as substrates for catalysts for converting automotive exhaust, for example, or as diesel particulate filters or as regenerator cores. Use of cordierite is favorable in these applications because of its good thermal shock resistance. The thermal shock resistance is inversely proportional to the coefficient of thermal expansion (CTE). That is, honeycombs with low thermal expansion have good thermal shock resistance and can survive the wide temperature fluctuations that are encountered in the application.

Although the mineral cordierite has an intrinsically low CTE (about $17 \times 10^{-7} °C.^{-1}$ (25–800° C.)), cordierite ceramics formed by the reaction of certain simple or complex natural or synthetic raw materials (e.g. kaolin+talc+alumina; magnesia+alumina+silica; spinel+silica) can exhibit CTE's that are much lower. The attainment of these low expansions is dependent on three microstructural features related to the nucleation and growth of the cordierite: microcracking, crystal orientation, and residual phases.

Microcracking is dependent on the anisotropy in the thermal expansion of cordierite along its crystallographic axes. Thermal stresses generated during cooling after firing result in microcrack formation. During reheating, some of the thermal expansion of the ceramic body is accommodated by the re-closing of the microcracks, yielding a reduction in the bulk CTE of the ceramic. The presence of microcracking in a ceramic body is manifested by hysteresis in the thermal expansion curve for that body.

The development of a non-random orientation of the cordierite crystals during sintering also influences thermal expansion. The extrusion of cellular bodies of cordierite-forming batches imparts an alignment or foliation of the tabular and plate-like raw materials, which in turn results in the growth of cordierite crystals in which the negative-expansion c-axes of the cordierite crystals tend to lie within the plane of the honeycomb walls. This microstructural feature further contributes to a reduced CTE in both the axial and radial dimensions of the honeycomb. The extent to which the cordierite crystals are oriented with their c axes in the plane of the cell walls of the honeycomb is measured by x-ray diffractometry (XRD) of the as-fired surfaces of the walls. Specifically, the XRD intensities of the (110) and (002) reflections from the cordierite crystals (based upon hexagonal indexing) are determined for the as-fired surface of the cell wall. The intensity of the (110) reflection, I(110), is proportional to the fraction of crystals lying with their c axes in the plane of the wall, while the intensity of the (002) reflection, I(002), is proportional to the fraction of crystals growing orthogonal to the cell wall. An "I-ratio" is defined by the following relation:

$$I = \frac{I(110)}{I(110) + I(002)}$$

The I ratio ranges from 0.0 for a body in which all of the cordierite crystals are oriented with their c axes perpendicular to the cell wall, to 1.00 for a body in which all of the crystals lie with their c axes within the plane of the wall. It has been found experimentally that a body in which the cordierite crystals are randomly oriented exhibits an I-ratio equal to approximately 0.655.

Finally, to achieve a low-CTE cordierite body, it is necessary that the reaction of the cordierite-forming raw materials proceed essentially to completion so that there exists a minimum of residual, high-expansion phases such as glass, cristobalite, mullite, alumina, spinel, and sapphirine in the body after sintering.

The formation of low thermal expansion cordierite bodies is dependent therefore on the nucleation of the cordierite raw materials and on its subsequent growth. An interplay exists between firing schedule and the nature of the raw materials such that a batch that yields a low-CTE ceramic when fired on a long schedule may result in a high expansion on a shorter schedule and vice versa. Specifically, shortening of the schedule may result in incomplete reaction of some batches, resulting in a CTE increase due to the presence of residual, high expansion phases. Alternately, faster firing rates and shorter schedules could decrease the expansion of other batches (provided that the reaction to form cordierite is nearly complete) by increasing the amount of microcracking.

At present cordierite-forming cellular ceramics are fired at heating rates of about 10 to 200° C./hr. through specific segments, with average heating rates of approximately 30 to 70°/hr. from 25° C. to maximum temperature. Soak times at maximum temperature range from about 6 to 12 hours, and total firing cycles are greater than about 25 hours in duration.

A method for producing low thermal expansion cordierite bodies in which the total firing time is substantially less than 20 hours, and preferably less than 5 hours would have several advantages. Among the advantages would be more efficient use of equipment, less energy consumption, and greater productivity.

SUMMARY OF THE INVENTION

In accordance with one aspect of the invention, there is provided a method of producing a cordierite body that involves providing cordierite-forming raw materials as talc, calcined talc, MgO-forming component, magnesium aluminate spinel, $SiO_2$-forming component, $Al_2O_3$-forming component, kaolin, calcined kaolin, and/or mullite such that the quantity R is less than about 10.156. R is 0.140 (wt. % mullite powder)
+0.433 (wt. % $SiO_2$ powder)

+0.0781 (wt. % alpha $Al_2O_3$ powder)(mean particle size of alpha $Al_2O_3$ powder measured in micrometers)
+0.0872 (wt. % $Al(OH)_3$ powder)(mean particle size of $Al(OH)_3$ powder measured in micrometers)
+0.00334 (wt. % $SiO_2$ powder)(wt. % spinel powder)
+2.330 $\log_{10}$ (1+(wt. % MgO-forming component)(wt. % calcined kaolin))
−0.244 (wt. % MgO-forming component)
−0.167 (wt. % dispersible high surface area $Al_2O_3$-forming component)
+1.1305 (heating time at maximum temperature)$^{-1}$.

The raw materials are intimately blended with effective amount of vehicle and forming aids to impart plastic formability and green strength to the raw materials and form a plastic mixture. A green body is formed which is dried and heated from room temperature up to a maximum temperature of about 1360° C. to 1435° C. at an average heating rate of at least about 315° C. per hour and held at maximum temperature for about 0.05 to 4.4 hours. The total heating time from room temperature to the end of the hold at the maximum temperature is less than about 4.5 hours. The resulting body is predominately cordierite, having a mean coefficient of thermal expansion from about 25° C. to 800° C. of less than about $15\times10^{-7}$°C.$^{-1}$ in at least one direction.

In accordance with another aspect of the invention, the raw materials are talc, an alumina-forming source, and silica, wherein the mean particle diameter of the talc is less than about 4 micrometers, and that of the alumina-forming source is less than about 2 micrometers.

DETAILED DESCRIPTION OF THE INVENTION

The present invention relates to a method of producing a cordierite body having a mean coefficient of thermal expansion (CTE) from 25° C. to 800° C. of less than about $15\times10^{-7}$°C.$^{-1}$ in at least one of three orthogonal directions by mixing together certain magnesium, aluminum, and silicon containing raw materials, fabricating a green body such as by extrusion, heating the body up to a maximum temperature of about 1360° C. to 1435° C., at an average heating rate from room temperature to maximum temperature of at least about 315° C. per hour and holding at the maximum temperature for about 0.05 hours to 4.4 hours. The total heating time from room temperature until the end of the soak at maximum temperature is less than about 4.5 hours.

All particle sizes are mean or average particle diameter as measured by a sedimentation technique.

All percents are in weight unless otherwise specified.
The Raw Materials

The raw materials are selected that will form cordierite by reaction with one another on firing. Such raw materials include talc, calcined talc, MgO-forming component, magnesium aluminate spinel, $SiO_2$-forming component, $Al_2O_3$-forming component, kaolin, calcined kaolin, and/or mullite.

By $Al_2O_3$-forming component is meant $Al_2O_3$ itself or other material having low water solubility which when fired converts to $Al_2O_3$. Some typical $Al_2O_3$-forming components include alpha-alumina, $Al(OH)_3$, and dispersible high surface area $Al_2O_3$-forming components.

The dispersible high surface area $Al_2O_3$-forming component or source can be provided as the powder or as a sol. By dispersible is meant that the agglomerates of very fine particles can be broken up and dispersed into the constituent particles. By high surface area is meant a surface area greater than about 10 m$^2$/g and preferably greater than about 40 m$^2$/g. Such powders can include boehmite, pseudoboehmite, gamma-phase alumina, delta-phase alumina, or other so-called transition aluminas. By MgO-forming component is meant MgO itself, or other material having low water solubility which when fired converts to MgO, such as $Mg(OH)_2$, $MgCO_3$, or combinations of these, etc.

Silica-forming component can be e.g. quartz, fused silica, colloidal silica powder or sol, and/or silicon organometallic compounds.

The composition preferably consists essentially of nominally about 12% to 16% magnesium oxide, about 33% to 38% aluminum oxide, and about 49% to 54% silica. The most preferred composition consists essentially of nominally about 12.5% to 15.5% magnesium oxide, about 33.5% to 37.5% aluminum oxide, and about 49.5% to 53.5% silica.

Low CTE is favored by longer heating times, low contents of an alpha-alumina or aluminum hydroxide raw material, fine particle size of the alpha-alumina or aluminum hydroxide powder when such a material is present, and a minimal amount of silica powder. Such processing conditions and raw material properties facilitate that reaction of the raw materials to form the desired cordierite phase. When free silica is present as a raw material, the amount of spinel raw material is preferably low. However, when free silica is low or absent, spinel as a raw material is beneficial in lowering CTE when it replaces an alpha-alumina or aluminum hydroxide. Longer soak times and/or higher soak temperatures are especially effective when silica powder is used and/or when the particle size of the alpha-alumina or aluminum hydroxide is coarse. The use of mullite powder as a source of Al and Si is preferably low, as mullite powder reduces the preferred orientation of the cordierite and also reduces the extent of microcracking. It is anticipated that kyanite or sillimanite (both $Al_2SiO_5$) would behave similarly to mullite ($Al_6Si_2O_{13}$) in raising CTE. However, these aluminosilicate raw materials would probably help reduce cracking when they substitute for kaolin in the batch. The combined use of an MgO-forming component and a calcined kaolin is preferably minimized because this combination also raises CTE by reducing crystal orientation and microcracking. However, when calcined kaolin is absent, the use of an MgO-forming source is beneficial in promoting growth of the cordierite and attainment of low CTE. The use of a dispersible high surface area $Al_2O_3$-forming powder or sol is also beneficial in reducing CTE.

The raw materials for forming the cordierite body are at least those that satisfy the following relationship with the quantity R being less than about 10.156 and being defined as:

0.140 (wt. % mullite powder)
+0.433 (wt. % $SiO_2$ powder)
+0.0781 (wt. % alpha $Al_2O_3$ powder)(mean particle size of alpha $Al_2O_3$ powder measured in micrometers)
+0.0872 (wt. % $Al(OH)_3$ powder)(mean particle size of $Al(OH)_3$ powder measured in micrometers)
+0.00334 (wt. % $SiO_2$ powder)(wt. % spinel powder)

+2.330 $\log_{10}$ (1+(wt. % MgO-forming component)(wt. % calcined kaolin))

−0.244 (wt. % MgO-forming component)

−0.167 (wt. % dispersible high surface area $Al_2O_3$-forming component)

+1.1305 (heating time at maximum temperature)$^{-1}$

In the raw material mixtures that contain kaolin, part or all of the kaolin can be replaced with a calcined kaolin to reduce the tendency of the green body to fracture during firing. When a calcined kaolin is used, it preferably consists predominately of particles having a plate-like morphology, and is preferably calcined at a sufficiently high temperature to form some mullite within the former clay particles. It has been found that the mullite within the calcined kaolin particles does not increase CTE, in contrast to the presence of particulate mullite in the raw material mixture. In mixtures that include calcined kaolin, it is preferred that the calcined kaolin have at least about 1% by weight mullite crystallites.

The relationship of CTE to firing cycle and raw materials is appreciated with reference to the examples in Tables 1 to 3.

To achieve low CTE's with short firing times using less than about 5% mullite and less than about 5% silica powder, six types of batches are preferred: (1) talc, spinel, and kaolin, (2) talc, spinel, kaolin, and calcined kaolin, (3) talc, MgO-forming source, and kaolin, (4) MgO-forming source, kaolin, and silica powder, (5) talc, kaolin, and an $Al_2O_3$-forming source, and (6) talc, kaolin, an $Al_2O_3$-forming source, and calcined kaolin.

With the first and second combinations, the kaolin preferably has a mean particle diameter of less than about 3 micrometers.

With the fourth combination, the kaolin preferably has a mean particle diameter of greater than about 3 micrometers.

With the fifth and sixth combinations, it is preferred that the alumina-forming source have a mean particle diameter of less than about 2.0 micrometers and/or a specific surface area greater than about 5 $m^2/g$.

Especially advantageous mixtures with the fifth and sixth raw material combinations are those in which the alumina-forming source has a mean particle diameter of less than about 2.0 micrometers and/or a specific surface area greater than about 5 $m^2/g$, and the alumina-forming source is provided as a dispersible high surface area powder or sol in which the specific surface area of the alumina-forming source is greater than about 10 $m^2/g$. The dispersible high surface area alumina-forming source is preferably boehmite, pseudoboehmite, or gamma-phase alumina.

Still other advantageous mixtures with the fifth or sixth raw material combinations are those in the which alumina-forming source has a mean particle diameter of less than about 2.0 micrometers and/or a specific surface area greater than about 5 $m^2/g$, and the mean particle diameter of the talc is less than about 4.0 micrometers. In these latter cases it is especially advantageous that the mean particle diameter of the kaolin be greater than about 3.0 micrometers.

In another embodiment, another advantageous raw material combination is talc, an alumina-forming source, and silica in which the mean particle diameter of the talc is less than about 4 micrometers, and that of the alumina-forming source is less than about 2 micrometers. This combination is not restricted by the above given value of R.

Raw materials are selected so that the total of $K_2O + Na_2O + CaO$ is less than about 0.5%.

The raw materials are blended with vehicle and forming aids that impart plastic formability and green strength to the raw materials when they are shaped into a body. When the forming is done by extrusion, the extrusion aids are most typically cellulose ether organic binder, and a lubricant such as sodium ammonium or diglycol stearate, although the invention is not limited to these.

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose or combinations of these being preferred. Preferred sources of cellulose ethers are Methocel A4M, F4M, F240, and K75M from Dow Chemical Co. Methocel A4M is a methylcellulose, while Methocel F4M, F240, and K75M are hydroxypropyl methylcellulose.

The organic binder content is typically is about 3% to 6%, based on the raw material.

The vehicle can be inorganic, i.e. consisting largely of water, which is typically but not exclusively about 28% to 46%; or it can be organic. The use of water is preferred, although evaporable organic liquids such as lower alkanols can be wholly or partly substituted as desired.

The weight percents of the organic binder, vehicle and other additives are calculated as superadditions with respect to the raw materials.

The mixture is then formed into a green body. The preferred forming method is by extrusion through a die. Extrusion can be done by using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The bodies according to the present invention can have any convenient size and shape. However, the process is especially suited to production of cellular monolith bodies such as honeycombs, particularly those having diameters less than about 7.6 cm (3 inches). Cellular bodies find use in a number of applications such as catalyst carriers, filters such as diesel particulate filters, molten metal filters, regenerator cores, etc.

Generally honeycomb cell densities range from 235 cells/$cm^2$ (about 1500 cells/$in^2$) to 15 cells/$cm^2$ (about 100 cells/$in^2$). Some examples of commonly used honeycombs in addition to these, although it is to be understood that the invention is not limited to such, are about 94 cells/$cm^2$ (about 600 cells/in$^2$), about 62 cells/cm$^2$ (about 400 cells/in$^2$), or about 47 cells/cm$^2$ (about 300 cells/in$^2$), and those having about 31 cells/cm$^2$ (about 200 cells/in$^2$). Typical wall thicknesses are for example, about 0.15 mm (about 6 mils) for about 62 cells/cm$^2$ (about 400 cells/in$^2$) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/cm$^2$ (about 100 to about 200 cells/in$^2$) and about 0.30 to about 0.64 mm (about 12 to about 25 mil) wall thicknesses are especially suited for diesel particulate filter applications. This invention is especially advantageous for honeycombs having very thin walls, e.g. $\leq$0.13 mm (5 mils). Thinner walled honeycombs can be made e.g. 0.025–0.1 mm (1–4 mils) for some of the inventive mixtures especially those that contain clay, alumina, and a talc all of which have a mean particle size of <3 micrometers in diameter.

The green body is then dried according to conventional procedures for green cordierite bodies such as e.g. oven or dielectric drying.

The dried body is then fired under the conditions described earlier from room temperature to a maximum temperature of about 1360° C. to 1435° C. Although the mean heating rate is more rapid than has been routinely employed in firing cordierite ceramics, e.g. honeycombs, it is appreciated that slower heating rates can be employed through certain segments of the firing schedule in which the body is undergoing shrinkage or an endothermic reaction. Thus, for example, it is desirable to fire a talc and kaolin containing body at a heating rate of $\leq$200° C./hr. between about 400° C. and 550° C. (kaolin water loss) and between about 800° C. and 950° C. (talc water loss), and between about 950° C. and 1150° C. (high shrinkage region). However, the heating rate can be accelerated during other portions of the firing schedule to yield an average rate from about 25° C. to maximum temperature of at least about 315° C./hr. The fast-firing cycles of the inventive method are especially suitable for firing in roller hearth kilns or by microwave sintering.

The fired body is then cooled to room temperature in as short a time as is practical.

When prepared according to the inventive methods, the bodies exhibit a CTE from 25 to 800° C. of less than about $15 \times 10^{-7}$°C.$^{-1}$.

Volume porosities are observed to range from about 5% to 35%, although it is probable that a pore-forming agent can be added to increase the volume fraction of porosity in the fired body. Median pore sizes range from about 0.2 to 13 microns, depending upon the particle sizes of the raw materials, and can probably be extended to larger pore sizes.

To more fully illustrate the invention, the following non-limiting examples are presented. All parts, portions, and percentages are on a weight basis unless otherwise stated.

Table 1 lists the raw materials used in the compositions prepared according to the inventive method and comparative methods. Firing schedules of the examples are given in Table 2, and physical properties of the examples are given in Table 3. All batches were mixed with water, methylcellulose, and sodium stearate, and extruded as 2.54 cm (1 inch) diameter, 62 cells/cm$^2$ (400 cells/in.$^2$), 0.2 mm (8 mil) wall honeycomb. All examples were fired in electrically heated furnaces. Firings greater than about 40 hours were performed in silicon carbide "Globar" furnaces, whereas all other firings were conducted in furnaces with molybdenum disilicide heating elements.

INVENTIVE AND COMPARATIVE EXAMPLES

The thermal expansions of all inventive and comparative examples for which the firing cycle is less than about 4.5 hours listed in Table 3 are consistent with the restrictive equation for raw materials with the exception of Example No. 83, as discussed below. That is, the value of R is less than 10.156 for all inventive examples and is greater than 10.156 for all comparative examples for which the firing cycle is less than about 4.5 hours. Thermal expansions were measured along the direction parallel to the lengths of the open channels of the honeycomb ceramics.

Raw Material Combinations that Contain MgAl$_2$O$_4$ Spinel

Examples 1 to 5 demonstrate inventive methods for yielding low-CTE bodies from raw material combinations consisting of talc+kaolin+spinel when the mean particle size of the talc is about 6.1 micrometers and the mean particle size of the kaolin is at least as fine as 0.4 micrometers, or at least as coarse as about 7.4 micrometers. Inventive Examples 6 and 7 show that the mean particle size of the talc can be reduced to at least as fine as about 1.6 micrometers. Inventive Example 8 illustrates that at least some of the kaolin can be replaced with a calcined kaolin.

Comparative Example 9 demonstrates that very high CTE's are obtained when silica powder is used as the only source of SiO$_2$ and when the firing cycle is less than about 4.5 hours. This is consistent with the fact that the value of R calculated for this example is about 31.3, which is greater than the limiting value of about 10.156 for the inventive methods. Comparative Example 10 shows that low CTE can be obtained for a raw material combination of spinel+silica powder when the firing cycle is extended to allow complete reaction of these raw materials.

Raw Material Combinations that Contain an MgO-Forming Source

Examples 11 to 18 and Examples 20 to 23 demonstrate inventive methods based on a mixture of talc+kaolin+an MgO-forming source, in which the mean particle size of the talc is about 6.1 micrometers and the mean particle size of the MgO-forming source can be at least as fine as 0.8 micrometers (Composition No. 8) or at least as coarse as about 6.5 micrometers (Composition Nos. 9 and 10). Low CTE's are obtained for firing cycles at least as short as 1.8 hours due to the fast rate of cordierite growth in raw material mixtures which have little or no silica powder and little or no alpha-alumina or aluminum hydroxide powder of coarse particle size or low surface area. However, Comparative Example 19 shows that high CTE's are obtained when Composition No. 9 is fired on a longer, slower cycle, due to a lower amount of microcracking.

Examples 24 and 25 illustrate that the mean particle size of the talc can be at least as fine as about 1.6 micrometers in raw material mixtures that also contain kaolin and MgO.

Examples 26 and 28 demonstrate that mixtures of MgO+kaolin+silica powder yield CTE's less than about $15 \times 10^-$ 7°C.$^{-1}$ when fired in less than about 4.5 hours. The low CTE is the result of extensive microcracking; the microstructure of the body exhibits very little preferential orientation of the cordierite crystals with their c-axes in the plane of the cell walls, as indicated by the low I-ratio. Examples 27 and 29 show that these raw material mixtures yield high CTE's when conventionally slow heating rates are employed.

Example 30 illustrates that some of the kaolin in MgO+kaolin+silica mixtures can be replaced with an alumina-forming source and additional silica powder and still yield a body having a CTE less than about 15×10$^{-7}$°C.$^{-1}$ when fired in less than 4.5 hours, provided that raw materials still fulfill the requirement that "R" be less than about 10.156.

Example 31 shows that the combination of MgO, talc, kaolin, and calcined kaolin constitutes an inventive method when the value of "R" is less than 10.156. Firing this raw material at a slower heating rate results in a CTE greater than about 15×10$^{-7}$°C.$^{-1}$, as seen in Example 32. Example 33 demonstrates that the talc particle size may be at least as coarse as about 6.1 micrometers in this combination of raw materials.

Example 34 illustrates that a mixture of MgO+calcined kaolin+silica powder yields a CTE less than 15×10$^{-7}$°C.$^{-1}$; however, this CTE is higher than many of the other inventive examples, consistent with the high "R" value for this combination of raw materials. Comparative Example 35 shows that this mixture results in a CTE greater than 15×10$^{-7}$°C.$^{-1}$ when fired according to a conventional slow schedule.

Example 36 demonstrates that the combination of MgO+fine alumina+silica powder does not constitute an inventive method. The high CTE is the result of a large amount of residual high-expansion spinel phase that formed by reaction between the magnesia and alumina. The CTE greater than 15×10$^{-7}$°C.$^{-1}$ is consistent with the fact that the "R" value for this raw material mixture is 20.5, greater than the limiting value of 10.156. Example 37 shows that MgO+fine alumina+silica powder is capable of yielding a low-CTE body when the firing cycle is extended to much longer times.

Comparative Example 38 further illustrates that a mixture of Mg(OH)$_2$+Al(OH)$_3$ having a mean particle size of 3 micrometers+silica powder does not comprise the present inventive method. The computed "R" value is 25.8, greater than the upper limit of 10.156 for inventive methods, and the high CTE of 31.6×10$^{-7}$°C.$^{-1}$ is the result of a large amount of residual spinel in the body.

Raw Material Combinations that Contain Talc+Kaolin+an Alumina-Forming Source

Inventive Examples 39 to 42 demonstrate that combinations of talc+fine kaolin+fine alumina yield low CTE bodies when fired in less than 4.5 hours for talc mean particle sizes at least as fine as 1.6 micrometers and at least as coarse as 6.1 micrometers.

Inventive Example 43 shows that some of the kaolin can be replaced with silica powder and more fine alumina and still produce a low-CTE body on a fast schedule.

Comparative Example 44 illustrates that CTE's above 15×10$^{-7}$°C.$^{-1}$ result when part of the kaolin is replaced with a larger amount of alumina and Al(OH)$_3$ having a coarse particle size and a large amount of silica powder. The high expansion is the result of large amounts of residual spinel, and is consistent with the high "R" computed for this raw material combination. Example 45 shows that these raw materials will yield a lower CTE when provided with more time for the cordierite-forming reaction to progress.

Inventive Example 46 shows that an especially low CTE is obtained for the combination of talc+kaolin+a highly dispersible AlOOH powder having a high surface area.

Inventive Example 47 demonstrates that a mixture of talc+kaolin+fine alumina yields a low-CTE body when fired in under 4.5 hours even when the kaolin has a mean particle size at least as coarse as 7.4 micrometers. Example 48 shows that such mixtures constitute an inventive method even when the mean particle size of the talc is much less than that of the kaolin.

Examples 49 and 50 illustrate that firing mixtures of talc+kaolin+an alumina having a mean particle size as coarse as 4.5 micrometers in less than 4.5 hours comprises the inventive method; however CTE's are not as low as when a finer alumina powder is used, consistent with the high computed "R" value for the coarse alumina-containing mixtures.

Raw Material Combinations that Contain Talc+Kaolin+Calcined Kaolin+an Alumina-Forming Source Inventive Examples 51 to 53, 55 to 63, and 65 to 72 demonstrate that mixtures of talc+fine kaolin+calcined kaolin+fine alumina can be fired in less than 4.5 hours and yield bodies having CTE's less than 15×10$^{-7}$°C.$^{-1}$ for talc mean particle sizes at least as coarse as 6.1 micrometers and at least as fine as 1.6 micrometers. However, Comparative Examples 54, 64, and 73 illustrate that firing these bodies on an ultra-fast cycle of only 0.2 hours results in higher amounts of residual spinel and CTE's greater than 15×10$^{-7}$°C.$^{-1}$. Correspondingly, the computed "R" values for these raw material mixtures fired on such a short cycle are greater than the inventive limit of 10.156.

Inventive Example 74 shows that an especially low CTE can be obtained for firing cycles less than 4.5 hours for a mixture of talc+kaolin+calcined kaolin+a highly dispersible AlOOH powder having a high surface area.

Inventive Examples 75 to 80 illustrate that CTE's less than 15×10$^{-7}$°C.$^{-1}$ are obtainable for mixtures of talc+kaolin+calcined kaolin+alumina±silica powder even when the mean particle size of the alumina is as coarse as 4.5 micrometers. However, the coarse alumina results in higher expansions than when finer alumina is used, consistent with the elevated values of the computed "R" parameter.

Raw Material Combinations that Contain Talc+an Alumina-Forming Source+Silica

Comparative Example 81 demonstrates that a mixture of talc+alumina+silica yields a CTE greater than 15×10$^{-7}$°C.$^{-1}$ when fired in less than 4.5 hours and when the mean particle diameter of the talc is 6.1 micrometers. The computed "R" value is correspondingly greater than 10.156. Example 82 shows that this raw material combination is capable of producing a low-CTE body when fired on a conventional longer schedule.

Inventive Example 83 shows that a mixture of talc+alumina+silica fired on a 3.4 hour cycle yields a body having a CTE of only 10×10$^{-7}$°C.$^{-1}$, despite the fact that the calculated "R" parameter for this method is greater than the upper limit of 10.156. This illustrates an exception to the general rule. Thus mixtures of talc+alumina+silica can be fired in less than 4.5 hours to yield bodies with CTE's less than 15×10$^{-7}$°C.$^{-1}$ provided that the mean particle diameter of the talc is less than about 4 micrometers and the mean particle diameter of the alumina is finer than about 2 micrometers.

Comparative Example 84 demonstrates that a mixture of coarse talc+coarse alumina+silica does not result in a CTE less than $15 \times 10^{-7} °C.^{-1}$ when fired in less than 4.5 hours, consistent with the high value of "R" for this method. However, Example 85 shows that this combination can yield a low-CTE body when fired on a long cycle.

Raw Material Combinations that Contain Mullite

Comparative Examples 86 to 89 illustrate that raw material combinations that contain large amounts of mullite powder do not yield bodies with CTE's less than $15 \times 10^{-7} °C.^{-1}$ regardless of whether they are fired on a fast or slow schedule.

It is to be understood that while the present invention has been described in detail with respect to certain illustrative and specific embodiments thereof, it should not be considered limited to such but may be used in other ways without departing from the spirit of the invention and the scope of the appended claims.

TABLE 1

Weight percentages and mean particle sizes of raw materials used in examples

BATCH COMPOSITION IN WEIGHT PERCENT (mean particle size, in microns, given in parentheses)

| Composition Number | Talc | MgO | Mg(OH)$_2$ | MgAl$_2$O$_4$ | Kaolin | Calcined Kaolin | Mullite | Alumina | AlOOH (180 m$^2$/g) | Al(OH)$_3$ | Silica |
|---|---|---|---|---|---|---|---|---|---|---|---|
| 1 | 29.3 (6.1) | | | 11.0 (1.0) | 59.8 (0.4) | | | | | | |
| 2 | 29.3 (6.1) | | | 11.0 (1.0) | 59.8 (0.9) | | | | | | |
| 3 | 29.3 (6.1) | | | 11.0 (1.0) | 59.8 (7.4) | | | | | | |
| 4 | 29.3 (1.6) | | | 11.0 (1.0) | 59.8 (0.9) | | | | | | |
| 5 | 29.3 (1.6) | | | 11.0 (1.0) | 59.8 (7.4) | | | | | | |
| 6 | 31.1 (1.6) | | | 11.7 (1.0) | 18.6 (0.9) | 38.6 (1.6) | | | | | |
| 7 | | | | | 48.6 (1.0) | | | | | | 51.4 (4.6) |
| 8 | 14.3 (6.1) | 7.6 (0.8) | | | 78.1 (0.9) | | | | | | |
| 9 | 13.9 (6.1) | | 10.7 (6.5) | | 75.5 (0.9) | | | | | | |
| 10 | 13.9 (6.1) | | 10.7 (6.5) | | 75.5 (7.4) | | | | | | |
| 11 | 14.3 (1.6) | 7.6 (0.8) | | | 78.1 (0.9) | | | | | | |
| 12 | 14.3 (1.6) | 7.6 (0.8) | | | 78.1 (7.4) | | | | | | |
| 13 | | 12.3 (0.8) | | | 78.6 (0.9) | | | | | | 9.2 (4.6) |
| 14 | | 12.3 (0.8) | | | 78.6 (7.4) | | | | | | 9.2 (4.6) |
| 15 | | 12.5 (0.8) | | | 67.9 (0.9) | | | 4.7 (0.4) | | | 14.9 (4.6) |
| 16 | 15.3 (1.6) | 8.2 (0.8) | | | 33.4 (0.9) | 43.1 (1.6) | | | | | |
| 17 | 15.3 (6.1) | 8.2 (0.8) | | | 33.4 (0.9) | 43.1 (1.6) | | | | | |
| 18 | | 13.8 (0.8) | | | | 75.0 (1.6) | | | | | 10.3 (4.6) |
| 19 | | 13.8 (0.8) | | | | | | 35.1 (0.4) | | | 51.1 (4.6) |
| 20 | | | 16.0 (6.5) | | | | | | | 43.0 (3.0) | 41.0 (4.6) |
| 21 | 39.6 (2.1) | | | | 47.1 (0.3) | | | 13.3 (0.4) | | | |
| 22 | 39.6 (2.1) | | | | 47.1 (0.9) | | | 13.3 (0.4) | | | |
| 23 | 39.6 (6.1) | | | | 47.1 (0.3) | | | 13.3 (0.4) | | | |
| 24 | 39.6 (6.1) | | | | 47.1 (0.9) | | | 13.3 (0.4) | | | |
| 25 | 40.2 (6.1) | | | | 37.1 (0.9) | | | 17.8 (0.4) | | | 5.0 (0.6) |
| 26 | 39.2 (6.1) | | | | 21.7 (0.9) | | | 11.2 (4.6) | | 17.8 (3.0) | 10.0 (19.6) |
| 27 | 38.2 (6.1) | | | | 45.5 (0.9) | | | | 16.3 | | |
| 28 | 39.6 (6.1) | | | | 47.1 (7.4) | | | 13.3 (0.4) | | | |
| 29 | 39.6 (1.6) | | | | 47.1 (7.4) | | | 13.3 (0.4) | | | |
| 30 | 39.6 (6.1) | | | | 47.1 (0.9) | | | 13.3 (4.5) | | | |
| 31 | 39.6 (6.1) | | | | 47.1 (7.4) | | | 13.3 (4.5) | | | |
| 32 | 40.8 (6.1) | | | | 14.8 (0.9) | 30.8 (1.6) | | 13.7 (0.4) | | | |
| 33 | 40.9 (4.2) | | | | 12.8 (0.9) | 32.6 (1.6) | | 13.7 (0.4) | | | |
| 34 | 40.9 (3.4) | | | | 12.8 (0.9) | 32.6 (1.6) | | 13.7 (0.4) | | | |
| 35 | 40.9 (2.2) | | | | 12.8 (0.9) | 32.6 (1.6) | | 13.7 (0.4) | | | |
| 36 | 40.9 (1.6) | | | | 12.8 (0.9) | 32.6 (1.6) | | 13.7 (0.4) | | | |
| 37 | 40.0 (1.6) | | | | 14.0 (0.9) | 29.0 (1.6) | | | 17.1 | | |
| 38 | 40.7 (6.1) | | | | 15.4 (7.4) | 26.4 (1.6) | | 15.4 (4.5) | | | 2.0 (4.6) |
| 39 | 40.9 (1.6) | | | | 12.8 (7.4) | 32.6 (1.6) | | 13.7 (4.5) | | | |
| 40 | 40.9 (1.6) | | | | 12.8 (0.9) | 32.6 (1.8) | | 13.7 (4.5) | | | |
| 41 | 42.4 (6.1) | | | | | | | 34.2 (0.4) | | | 23.5 (4.6) |
| 42 | 42.4 (1.6) | | | | | | | 34.2 (0.4) | | | 23.5 (4.6) |
| 43 | 42.4 (6.1) | | | | | | | 34.2 (4.5) | | | 23.5 (4.6) |
| 44 | 42.4 (6.1) | | | | | | 47.6 (2.6) | | | | 10.1 (4.6) |
| 45 | 42.4 (6.1) | | | | | | 40.5 (2.6) | 5.1 (0.4) | | | 12.1 (4.6) |

TABLE 2

Firing schedules used for examples.

| Example Number | Composition Number | Example Type | Mean Heating Rate (25–1275° C.) (° C./hr) | Soak Time at 1275° C. (hrs) | Mean Heating Rate (1275–1410° C.) (° C./hr) | Maximum Soak Temperature (° C.) | Soak Time at Maximum Temperature (hrs) | Cycle Time* (hours) |
|---|---|---|---|---|---|---|---|---|
| 1 | 1 | Inventive | 1200 | 0 | 200 | 1410 | 1.7 | 3.4 |
| 2 | 1 | Inventive | 1200 | 0 | 500 | 1410 | 1.0 | 2.3 |
| 3 | 1 | Inventive | 1200 | 0 | 500 | 1410 | 0.5 | 1.8 |
| 4 | 2 | Inventive | 1200 | 0 | 200 | 1410 | 1.7 | 3.4 |
| 5 | 3 | Inventive | 1200 | 0 | 200 | 1410 | 1.7 | 3.4 |
| 6 | 4 | Inventive | 1200 | 0 | 200 | 1410 | 1.7 | 3.4 |
| 7 | 5 | Inventive | 1200 | 0 | 200 | 1410 | 1.7 | 3.4 |
| 8 | 6 | Inventive | 1200 | 0 | 200 | 1410 | 1.7 | 3.4 |
| 9 | 7 | Comparative | 1200 | 0 | 200 | 1410 | 1.7 | 3.4 |
| 10 | 7 | Comparative | 40 | 0 | 15 | 1425 | 10 | 51.3 |
| 11 | 8 | Inventive | 1200 | 0 | 200 | 1410 | 1.7 | 3.4 |
| 12 | 8 | Inventive | 1200 | 0 | 200 | 1410 | 1.7 | 3.4 |
| 13 | 8 | Inventive | 1200 | 0 | 500 | 1410 | 1.0 | 2.3 |
| 14 | 8 | Inventive | 1200 | 0 | 500 | 1410 | 0.5 | 1.8 |
| 15 | 9 | Inventive | 1200 | 0 | 200 | 1410 | 1.7 | 3.4 |
| 16 | 9 | Inventive | 1200 | 0 | 200 | 1410 | 1.7 | 3.4 |
| 17 | 9 | Inventive | 1200 | 0 | 500 | 1410 | 1.0 | 2.3 |
| 18 | 9 | Inventive | 1200 | 0 | 500 | 1410 | 0.5 | 1.8 |
| 19 | 9 | Comparative | 25 | 0 | 25 | 1410 | 8 | 63.4 |
| 20 | 10 | Inventive | 1200 | 0 | 200 | 1410 | 1.7 | 3.4 |
| 21 | 10 | Inventive | 1200 | 0 | 200 | 1410 | 1.7 | 3.4 |
| 22 | 10 | Inventive | 1200 | 0 | 500 | 1410 | 1.0 | 2.3 |
| 23 | 10 | Inventive | 1200 | 0 | 500 | 1410 | 0.5 | 1.8 |
| 24 | 11 | Inventive | 1200 | 0 | 200 | 1410 | 1.7 | 3.4 |
| 25 | 12 | Inventive | 1200 | 0 | 200 | 1410 | 1.7 | 3.4 |
| 26 | 13 | Inventive | 1200 | 0 | 200 | 1410 | 1.7 | 3.4 |
| 27 | 13 | Comparative | 50 | 0 | 50 | 1410 | 8 | 35.7 |
| 28 | 14 | Inventive | 1200 | 0 | 200 | 1410 | 1.7 | 3.4 |
| 29 | 14 | Comparative | 50 | 0 | 50 | 1410 | 8 | 35.7 |
| 30 | 15 | Inventive | 1200 | 0 | 200 | 1410 | 1.7 | 3.4 |
| 31 | 16 | Inventive | 1200 | 0 | 200 | 1410 | 1.7 | 3.4 |
| 32 | 16 | Comparative | 25 | 0 | 25 | 1410 | 8 | 63.4 |
| 33 | 17 | Inventive | 1200 | 0 | 200 | 1410 | 1.7 | 3.4 |
| 34 | 18 | Inventive | 1200 | 0 | 200 | 1410 | 1.7 | 3.4 |
| 35 | 18 | Comparative | 25 | 0 | 25 | 1410 | 8 | 63.4 |
| 36 | 19 | Comparative | 1200 | 0 | 200 | 1410 | 1.7 | 3.4 |
| 37 | 19 | Comparative | 50 | 0 | 50 | 1410 | 8 | 35.7 |
| 38 | 20 | Comparative | 1200 | 0 | 200 | 1410 | 1.7 | 3.4 |
| 39 | 21 | Inventive | 1200 | 0 | 200 | 1410 | 1.7 | 3.4 |
| 40 | 22 | Inventive | 1200 | 0 | 200 | 1410 | 1.7 | 3.4 |
| 41 | 23 | Inventive | 1200 | 0 | 200 | 1410 | 1.7 | 3.4 |
| 42 | 24 | Inventive | 1200 | 0 | 200 | 1410 | 1.7 | 3.4 |
| 43 | 25 | Inventive | 1200 | 0 | 200 | 1410 | 1.7 | 3.4 |
| 44 | 26 | Comparative | 1200 | 0.3 | 150 | 1410 | 1 | 3.2 |
| 45 | 26 | Comparative | 200 | 0 | 200 | 1410 | 12 | 18.9 |
| 46 | 27 | Inventive | 1200 | 0 | 200 | 1410 | 1.7 | 3.4 |
| 47 | 28 | Inventive | 1200 | 0 | 200 | 1410 | 1.7 | 3.4 |
| 48 | 29 | Inventive | 1200 | 0 | 200 | 1410 | 1.7 | 3.4 |
| 49 | 30 | Inventive | 1200 | 0 | 200 | 1410 | 1.7 | 3.4 |
| 50 | 31 | Inventive | 1200 | 0 | 200 | 1410 | 1.7 | 3.4 |

TABLE 2-continued

Firing schedules used for examples.

| Example Number | Composition Number | Example Type | Mean Heating Rate (25–1275° C.) (° C./hr) | Soak Time at 1275° C. (hrs) | Mean Heating Rate (1275–1410° C.) (° C./hr) | Maximum Soak Temperature (° C.) | Soak Time at Maximum Temperature (hrs) | Cycle Time* (hours) |
|---|---|---|---|---|---|---|---|---|
| 51 | 32 | Inventive | 1200 | 0 | 200 | 1410 | 1.7 | 3.4 |
| 52 | 32 | Inventive | 1200 | 0.3 | 150 | 1410 | 1 | 3.2 |
| 53 | 32 | Inventive | 1200 | 0 | 125 | 1410 | 0.5 | 2.6 |
| 54 | 32 | Comparative | 75000 | 0.083 | 83340 | 1414 | 0.083 | 0.2 |
| 55 | 33 | Inventive | 1200 | 0.3 | 150 | 1410 | 1 | 3.2 |
| 56 | 33 | Inventive | 1200 | 0 | 125 | 1410 | 0.5 | 2.6 |
| 57 | 33 | Inventive | 1200 | 1.0 | 500 | 1410 | 0.3 | 2.6 |
| 58 | 34 | Inventive | 1200 | 0.3 | 150 | 1410 | 1 | 3.2 |
| 59 | 34 | Inventive | 1200 | 0 | 125 | 1410 | 0.5 | 2.6 |
| 60 | 34 | Inventive | 1200 | 1.0 | 500 | 1410 | 0.3 | 2.6 |
| 61 | 35 | Inventive | 1200 | 0 | 200 | 1410 | 1.7 | 3.4 |
| 62 | 35 | Inventive | 1200 | 0.3 | 150 | 1410 | 1 | 3.2 |
| 63 | 35 | Inventive | 1200 | 0 | 125 | 1410 | 0.5 | 2.6 |
| 64 | 35 | Comparative | 75000 | 0.083 | 83340 | 1414 | 0.083 | 0.2 |
| 65 | 36 | Inventive | 1200 | 0 | 200 | 1410 | 1.7 | 3.4 |
| 66 | 36 | Inventive | 1200 | 0 | 200 | 1410 | 1.7 | 3.4 |
| 67 | 36 | Inventive | 1200 | 0 | 200 | 1410 | 1.7 | 3.4 |
| 68 | 36 | Inventive | 1200 | 0.3 | 150 | 1410 | 1 | 3.2 |
| 69 | 36 | Inventive | 1200 | 0 | 125 | 1410 | 0.5 | 2.6 |
| 70 | 36 | Inventive | 1200 | 1.0 | 500 | 1410 | 0.3 | 2.6 |
| 71 | 36 | Inventive | 1200 | 0 | 500 | 1410 | 1.0 | 2.3 |
| 72 | 36 | Inventive | 1200 | 0 | 500 | 1410 | 0.5 | 1.8 |
| 73 | 36 | Comparative | 75000 | 0.083 | 83340 | 1414 | 0.083 | 0.2 |
| 74 | 37 | Inventive | 1200 | 0 | 200 | 1410 | 1.7 | 3.4 |
| 75 | 38 | Inventive | 625 | 0.25 | 1620 | 1438 | 1 | 3.3 |
| 76 | 38 | Inventive | 625 | 0.25 | 1620 | 1438 | 1 | 3.3 |
| 77 | 38 | Inventive | 1200 | 0.3 | 150 | 1410 | 1 | 3.2 |
| 78 | 38 | Inventive | 1200 | 0 | 125 | 1410 | 0.5 | 2.6 |
| 79 | 39 | Inventive | 1200 | 0 | 200 | 1410 | 1.7 | 3.4 |
| 80 | 40 | Inventive | 1200 | 0 | 200 | 1410 | 1.7 | 3.4 |
| 81 | 41 | Comparative | 1200 | 0 | 200 | 1410 | 1.7 | 3.4 |
| 82 | 41 | Comparative | 25 | 0 | 25 | 1410 | 8 | 63.4 |
| 83 | 42 | Inventive | 1200 | 0 | 200 | 1410 | 1.7 | 3.4 |
| 84 | 43 | Comparative | 1200 | 0 | 200 | 1410 | 1.7 | 3.4 |
| 85 | 43 | Comparative | 40 | 0 | 15 | 1425 | 10 | 51.3 |
| 86 | 44 | Comparative | 1200 | 0 | 200 | 1410 | 1.7 | 3.4 |
| 87 | 44 | Comparative | 25 | 0 | 25 | 1410 | 8 | 63.4 |
| 88 | 45 | Comparative | 1200 | 0 | 200 | 1410 | 1.7 | 3.4 |
| 89 | 45 | Comparative | 25 | 0 | 25 | 1410 | 8 | 63.4 |

TABLE 3

| Example Number | Composition Number | Example Type | Mean CTE (10⁻⁷ °C⁻¹) (25–800° C.) | XRO I-Ratio | Computed Value of "R" | % Mullite | % Alumina | % Spinel | Vol % Porosity | Total Pore Volume (cm³/g) | Median Pore Diameter (μm) | % of Total Porosity between 0.5 and 5.0 μm | % of Total Porosity Greater than 10 μm |
|---|---|---|---|---|---|---|---|---|---|---|---|---|---|
| 1 | 1 | Inventive | 1.5 | | 0.7 | | | | 7.5 | 0.0322 | 0.3 | 8.1 | 4.7 |
| 2 | 1 | Inventive | 6.1 | | 1.1 | 4.0 | 0.0 | 6.4 | 7.0 | 0.0292 | 0.2 | 3.4 | 5.5 |
| 3 | 1 | Inventive | 9.6 | | 2.3 | 5.7 | 0.0 | 6.9 | 7.4 | 0.0313 | 0.2 | 7.3 | 2.6 |
| 4 | 2 | Inventive | 4.2 | | 0.7 | | | | 27.7 | 0.0819 | 11.3 | 10.9 | 57.0 |
| 5 | 3 | Inventive | 5.2 | | 0.7 | | | | 13.2 | 0.0269 | 0.4 | 22.0 | 13.8 |
| 6 | 4 | Inventive | 6.1 | | 0.7 | 0.9 | 0.0 | 7.3 | 6.3 | 0.0272 | | | |
| 7 | 5 | Inventive | 9.6 | | 0.7 | 1.1 | 0.0 | 3.7 | 23.1 | 0.1203 | 2.5 | 82.5 | 14.8 |
| 8 | 6 | Inventive | 6.1 | | 0.7 | 1.5 | 0.0 | 2.0 | 21.2 | 0.1095 | 1.7 | 76.7 | 17.0 |
| 9 | 7 | Comparative | 36.1 | | 31.3 | | | | | | | | |
| 10 | 7 | Comparative | 5.2 | | not applicable | 1.0 | 0.0 | 0.7 | | | | | |
| 11 | 8 | Inventive | 2.6 | | -1.2 | 1.8 | 0.0 | 2.1 | 14.5 | 0.0688 | 0.6 | 12.4 | 41.9 |
| 12 | 8 | Inventive | 3.9 | | -1.2 | | | | | | | | |
| 13 | 8 | Inventive | 3.4 | | -0.7 | 1.8 | 0.0 | 2.5 | 16.6 | 0.0779 | 0.7 | 13.5 | 40.1 |
| 14 | 8 | Inventive | 4.8 | | 0.4 | 2.6 | 0.0 | 2.9 | 16.1 | 0.0773 | 0.6 | 12.0 | 38.9 |
| 15 | 9 | Inventive | 4.3 | | -1.9 | 2.3 | 0.0 | 0.6 | 15.8 | 0.0766 | 0.5 | 5.4 | 37.1 |
| 16 | 9 | Inventive | 3.6 | | -1.9 | | | | | | | | |
| 17 | 9 | Inventive | 2.9 | | -1.5 | 1.5 | 0.0 | 1.1 | 8.8 | 0.0388 | 0.3 | 0.3 | 35.8 |
| 18 | 9 | Inventive | 3.6 | | -0.3 | 3.0 | 0.0 | 1.9 | 10.4 | 0.0465 | 0.3 | 4.1 | 34.4 |
| 19 | 9 | Comparative | 16.1 | | not applicable | 1.5 | 0.0 | 0.0 | 20.4 | 0.1115 | 2.3 | 31.7 | 31.8 |
| 20 | 10 | Inventive | 3.2 | | -1.9 | 2.1 | 0.0 | 2.3 | 13.2 | 0.0616 | 2.2 | 20.9 | 38.5 |
| 21 | 10 | Inventive | 3.0 | | -1.9 | | | | | | | | |
| 22 | 10 | Inventive | 5.2 | | -1.5 | 4.2 | 0.0 | 3.9 | 6.7 | 0.0287 | 0.4 | 23.7 | 9.4 |
| 23 | 10 | Inventive | 7.4 | | -0.3 | 3.5 | 0.0 | 3.4 | 8.6 | 0.0376 | 0.5 | 24.5 | 22.3 |
| 24 | 11 | Inventive | 3.1 | | -1.2 | 1.1 | 0.0 | 2.0 | 7.0 | 0.0301 | | | |
| 25 | 12 | Inventive | 1.7 | | -1.2 | 1.5 | 0.0 | 2.1 | 8.8 | 0.0391 | | | |
| 26 | 13 | Inventive | 6.9 | 0.68 | 1.6 | 0.8 | 0.0 | 1.1 | 11.6 | 0.0539 | 0.4 | 6.7 | 33.2 |
| 27 | 13 | Comparative | 17.2 | 0.77 | not applicable | 0.8 | 0.0 | 0.0 | 17.3 | 0.0879 | 0.6 | 29.2 | 20.8 |
| 28 | 14 | Inventive | 6.3 | | 1.6 | 2.1 | 0.0 | 3.2 | 22.0 | 0.1147 | 6.0 | 23.5 | 19.4 |
| 29 | 14 | Comparative | 18.6 | | not applicable | 1.5 | 0.0 | 0.0 | 37.4 | 0.2454 | 2.6 | 81.2 | 11.5 |
| 30 | 15 | Inventive | 8.1 | | 4.1 | | | | 25.7 | 0.1391 | 5.8 | 33.2 | 17.5 |
| 31 | 16 | Inventive | 11.1 | | 4.6 | 0.8 | 0.0 | 1.1 | 33.1 | 0.2041 | 1.9 | 95.6 | 3.3 |
| 32 | 16 | Comparative | 15.3 | | not applicable | 0.7 | 0.0 | 0.0 | 38.9 | 0.2569 | 1.4 | 95.1 | 4.0 |
| 33 | 17 | Inventive | 10.1 | | 4.6 | 1.5 | 0.0 | 1.1 | 34.9 | 0.2168 | 3.4 | 66.3 | 18.4 |

TABLE 3-continued

| Example Number | Composition Number | Example Type | Mean CTE (10⁻⁷ °C⁻¹) (25–800° C.) | XRO I-Ratio | Computed Value of "R" | % Mullite | % Alumina | % Spinel | Vol % Porosity | POROSMETRY Total Pore Volume (cm³/g) | Median Pore Diameter (μm) | % of Total Porosity between 0.5 μm and 5.0 μm | % of Total Porosity Greater than 10 μm |
|---|---|---|---|---|---|---|---|---|---|---|---|---|---|
| 34 | 18 | Inventive | 11.7 | | 8.8 | 1.5 | 0.0 | 0.0 | 22.6 | 0.1204 | 1.8 | 86.0 | 9.1 |
| 35 | 18 | Comparative | 16.9 | | not applicable | 0.3 | 0.1 | 11.8 | 14.7 | 0.0684 | 1.2 | 56.7 | 13.6 |
| 36 | 19 | Comparative | 23.3 | | 20.5 | 0.0 | 0.0 | 1.6 | 29.8 | 0.1722 | 3.2 | 80.9 | 6.8 |
| 37 | 19 | Comparative | 5.0 | | not applicable | 1.1 | 0.5 | 16.3 | 37.7 | 0.2438 | 6.7 | 16.6 | 20.1 |
| 38 | 20 | Comparative | 31.6 | | 25.8 | 0.7 | 1.0 | 1.2 | 8.0 | 0.0345 | 0.2 | 6.4 | 11.9 |
| 39 | 21 | Inventive | 5.9 | | 1.1 | 2.3 | 1.5 | 1.9 | 8.9 | 0.0395 | 0.2 | 7.2 | 10.5 |
| 40 | 22 | Inventive | 6.7 | | 1.1 | | | | | | | | |
| 41 | 23 | Inventive | 7.7 | | 1.1 | | | | | | | | |
| 42 | 24 | Inventive | 7.2 | | 1.1 | | | | | | | | |
| 43 | 25 | Inventive | 6.9 | | 1.2 | | | | | | | | |
| 44 | 26 | Comparative | 16.5 | | 14.1 | 1.6 | 1.0 | 10.9 | 6.3 | 0.0380 | 0.37 | 15.7 | 20.6 |
| 45 | 26 | Comparative | 8.4 | | not applicable | 1.4 | 0.0 | 3.5 | 36.5 | 0.2502 | 18.0 | 0.0 | 93.2 |
| 46 | 27 | Inventive | 4.4 | | −2.1 | | | | 19.7 | 0.1682 | 9.1 | 6.6 | 42.6 |
| 47 | 28 | Inventive | 7.3 | | 1.1 | | | | 24.9 | 0.1310 | 11.5 | 1.8 | 64.9 |
| 48 | 29 | Inventive | 3.1 | | 1.1 | 1.7 | 0.0 | 3.0 | 26.8 | 0.1425 | 4.0 | 66.7 | 6.1 |
| 49 | 30 | Inventive | 9.7 | | 5.3 | | | | | | | | |
| 50 | 31 | Inventive | 11.8 | | 5.3 | | | | | | | | |
| 51 | 32 | Inventive | 4.8 | | 1.1 | 1.9 | 0.0 | 2.2 | 20.0 | 0.1045 | 11.8 | 5.5 | 59.4 |
| 52 | 32 | Inventive | 4.5 | | 1.6 | 1.8 | 0.0 | 2.0 | 17.1 | 0.0919 | 9.3 | 8.2 | 45.7 |
| 53 | 32 | Inventive | 8.1 | | 2.7 | 2.4 | 0.0 | 2.8 | 20.0 | 0.1031 | 13.2 | 0.0 | 66.7 |
| 54 | 32 | Comparative | 22.7 | | 14.0 | 3.8 | 1.0 | 4.3 | | | | | |
| 55 | 33 | Inventive | 4.8 | | 1.6 | 1.8 | 0.0 | 0.8 | | | | | |
| 56 | 33 | Inventive | 7.5 | | 2.7 | 3.0 | 0.4 | 1.9 | 22.0 | 0.1154 | 5.5 | 30.1 | 22.2 |
| 57 | 33 | Inventive | 8.4 | | 4.2 | 3.1 | 0.4 | 2.5 | 21.9 | 0.1132 | 6.3 | 21.5 | 24.5 |
| 58 | 34 | Inventive | 5.7 | | 1.6 | 2.2 | 0.0 | 1.8 | | | | | |
| 59 | 34 | Inventive | 7.4 | | 2.7 | 2.5 | 0.2 | 2.9 | 27.4 | 0.1544 | 2.9 | 87.7 | 6.9 |
| 60 | 34 | Inventive | 8.7 | | 4.2 | 3.0 | 0.3 | 1.4 | 27.1 | 0.1480 | 2.7 | 87.4 | 5.4 |
| 61 | 35 | Inventive | 4.8 | | 1.1 | 2.1 | 0.0 | 2.3 | 23.5 | 0.1254 | 4.3 | 64.5 | 11.2 |
| 62 | 35 | Inventive | 6.3 | 0.83 | 1.6 | 2.3 | 0.0 | 2.0 | 27.0 | 0.1505 | 2.0 | 89.4 | 8.7 |
| 63 | 35 | Inventive | 8.2 | | 2.7 | 2.2 | 0.0 | 2.6 | 27.7 | 0.1562 | 3.2 | 83.0 | 10.6 |

TABLE 3-continued

| Example Number | Composition Number | Example Type | Mean CTE ($10^{-7}$ °C.$^{-1}$) (25–800° C.) | XRO I-Ratio | Computed Value of "R" | RESIDUAL PHASES | | | POROSMETRY | | | | |
|---|---|---|---|---|---|---|---|---|---|---|---|---|---|
| | | | | | | % Mullite | % Alumina | % Spinel | Vol % Porosity | Total Pore Volume (cm³/g) | Median Pore Diameter (μm) | % of Total Porosity between 0.5 μm and 5.0 μm | % of Total Porosity Greater than 10 μm |
| 64 | 35 | Comparative | 17.9 | | 14.0 | 2.6 | 0.7 | 4.5 | 24.6 | 0.1314 | 2.1 | 91.0 | 7.5 |
| 65 | 36 | Inventive | 4.3 | 0.87 | 1.1 | 1.2 | 0.0 | 1.6 | 26.0 | 0.1414 | 2.6 | 89.5 | 6.9 |
| 66 | 36 | Inventive | 4.6 | 0.83 | 1.1 | 1.7 | 0.3 | 1.6 | 22.8 | 0.1692 | 1.7 | 92.1 | 2.5 |
| 67 | 36 | Inventive | 3.9 | | 1.1 | 1.7 | 0.0 | 1.8 | 28.0 | 0.1566 | 1.8 | 89.3 | 9.9 |
| 68 | 36 | Inventive | 5.2 | | 1.6 | 2.2 | 0.0 | 2.1 | 27.9 | 0.1555 | 2.1 | 89.5 | 9.2 |
| 69 | 36 | Inventive | 7.6 | | 2.7 | 1.7 | 0.0 | 2.9 | | | | | |
| 70 | 36 | Inventive | 7.8 | | 4.2 | 2.6 | 0.0 | 2.9 | | | | | |
| 71 | 36 | Inventive | 6.1 | | 1.6 | 3.1 | 0.0 | 3.6 | 26.5 | 0.1431 | 2.9 | 86.4 | 7.5 |
| 72 | 36 | Inventive | 7.7 | | 2.7 | 2.3 | 0.6 | 3.3 | 23.5 | 0.1223 | 2.6 | 88.6 | 6.2 |
| 73 | 36 | Comparative | 16.4 | | 14.0 | 2.2 | 0.7 | 3.8 | | | | | |
| 74 | 37 | Inventive | 1.1 | | −2.2 | 1.5 | 0.0 | 5.4 | 5.1 | 0.0220 | | | |
| 75 | 38 | Inventive | 12.1 | | 7.4 | 4.2 | 0.6 | 2.3 | | | | | |
| 76 | 38 | Inventive | 9.8 | | 7.4 | 2.8 | 0.0 | 3.2 | | | | | |
| 77 | 38 | Inventive | 14.1 | | 7.4 | 1.9 | 0.0 | 2.9 | | | | | |
| 78 | 38 | Inventive | 14.7 | | 8.5 | 2.0 | 0.0 | 4.6 | | | | | |
| 79 | 39 | Inventive | 10.6 | | 5.5 | 2.7 | 1.3 | 5.9 | 32.9 | 0.2032 | 9.4 | 3.1 | 43.4 |
| 80 | 40 | Inventive | 10.0 | | 5.5 | 2.4 | 0.7 | 4.3 | 30.8 | 0.1743 | 4.8 | 57.8 | 11.7 |
| 81 | 41 | Comparative | 17.9 | | 11.9 | 1.3 | 0.0 | 3.6 | 25.0 | 0.1323 | 9.4 | 1.1 | 40.7 |
| 82 | 41 | Comparative | 2.9 | | not applicable | 0.9 | 0.9 | 8.9 | 31.4 | 0.1858 | 4.1 | 63.2 | 11.7 |
| 83 | 42 | Inventive | 10.0 | | 11.9* | 0.6 | 0.0 | 1.1 | 31.1 | 0.1815 | 4.0 | 78.7 | 5.6 |
| 84 | 43 | Comparative | 28.0 | | 22.9 | | 0.5 | 6.3 | | | | | |
| 85 | 43 | Comparative | 4.2 | | not applicable | 1.3 | 0.0 | 1.8 | | | | | |
| 86 | 44 | Comparative | 18.3 | | 11.7 | | | | | | | | |
| 87 | 44 | Comparative | 16.6 | | not applicable | 1.9 | 0.0 | 1.5 | 35.7 | 0.2329 | 5.9 | 35.7 | 16.8 |
| 88 | 45 | Comparative | 17.1 | | 11.7 | | | | | | | | |
| 89 | 45 | Comparative | 15.8 | | not applicable | 2.2 | 0.0 | 1.5 | 33.8 | 0.2119 | 6.0 | 34.6 | 23.2 |

What is claimed is:

1. A method of producing a cordierite body, the method comprising:

a) providing cordierite-forming raw materials selected from the group consisting of talc, calcined talc, MgO-forming component, magnesium aluminate spinel, $SiO_2$-forming component, $Al_2O_3$-forming component, kaolin, calcined kaolin, mullite, and combinations thereof, chosen such that the quantity R is less than about 10.156, wherein R is defined as 0.140 (wt. % mullite powder)

+0.433 (wt. % $SiO_2$ powder)

+0.0781 (wt. % alpha $Al_2O_3$ powder)(mean particle size of alpha $Al_2O_3$ powder)

+0.0872 (wt. % $Al(OH)_3$ powder)(mean particle size of $Al(OH)_3$ powder)

+0.00334 (wt. % $SiO_2$ powder)(wt. % magnesium aluminate spinel powder)

+2.330 $\log_{10}$ (1+(wt. % MgO-forming component)(wt. % calcined kaolin))

−0.244 (wt. % MgO-forming component)

−0.167 (wt. % dispersible high surface area $Al_2O_3$-forming component)

+1.1305 (heating time measured in hours at maximum temperature, wherein the MgO-forming component is selected from the group consisting of MgO, $Mg(OH)_2$, $MgCO_3$, and combinations thereof, the $SiO_2$-forming component is selected from the group consisting of quartz, fused silica, colloidal silica powder, colloidal silica sol, silicon organometallic compounds, and combinations thereof;

the $Al_2O_3$-forming component is selected from the group consisting of alpha-alumina, $Al(OH)_3$, dispersible high surface area $Al_2O_3$ forming source, and combinations thereof, the $SiO_2$ powder is selected from the group consisting of quartz, fused silica, and combinations thereof, wt. % is based on the total weight of the raw materials, and the particle size is measured in micrometers;

b) intimately blending the raw materials with an effective amount of vehicle and forming aids to impart plastic formability and green strength to the raw materials and form a plastic mixture therefrom;

c) forming said raw materials into a green body;

d) drying the green body; and e) heating said green body from room temperature up to a maximum temperature of about 1360° C. to 1435° C. at an average heating rate of at least about 315° C. per hour and holding at said maximum temperature for about 0.05 to 4.4 hours, wherein the total heating time from room temperature to the end of the hold at the maximum temperature is less than about 4.5 hours, to produce a body that is predominately cordierite, having a mean coefficient of thermal expansion from about 25° C. to 800° C. of less than about $15 \times 10^{-7}$°C.$^{-1}$ in at least one direction.

2. A method of claim 1 wherein the raw materials are provided by combinations selected from the group consisting of a first combination of talc, spinel, and kaolin, a second combination of talc, spinel, kaolin, and calcined kaolin, a third combination of talc, MgO-forming source, and kaolin, a fourth combination of MgO-forming source, kaolin, and silica powder, a fifth combination of talc, kaolin, and an $Al_2O_3$-forming source, and a sixth combination of talc, kaolin, an $Al_2O_3$-forming source, and calcined kaolin.

3. A method of claim 2 wherein the raw materials are provided by combinations selected from the group consisting of said first combination and said second combination, wherein the kaolin has a mean particle diameter of less than about 3 micrometers.

4. A method of claim 2 wherein the raw materials are provided by said fourth combination, wherein the kaolin has a mean particle diameter of greater than about 3 micrometers.

5. A method of claim 2 wherein the raw materials are provided as a combination selected from the group consisting of said second combination, and said sixth combination, wherein the calcined kaolin has at least about 1% by weight mullite crystallites therein.

6. A method of claim 2 wherein the raw materials are provided as a combination selected from the group consisting of said fifth combination, and said sixth combination, wherein the alumina-forming source has a mean particle diameter of less than about 2.0 micrometers and/or a specific surface area greater than about 5 $m^2/g$.

7. A method of claim 6 wherein the alumina-forming source is provided as a dispersible high surface area powder or sol in which the specific surface area of the particles is greater than about 10 $m^2/g$.

8. A method of claim 6 wherein the mean particle diameter of the talc is less than about 4.0 micrometers.

9. A method of claim 8 wherein the mean particle diameter of the kaolin is greater than about 3.0 micrometers.

10. A method of claim 1 wherein the raw materials are shaped by extrusion.

11. A method of claim 10 wherein said raw materials are extruded into a honeycomb structure.

* * * * *